United States Patent
Armendariz et al.

(10) Patent No.: US 12,241,382 B2
(45) Date of Patent: Mar. 4, 2025

(54) VIBRATION RESPONSE REDUCTION FOR AIRCRAFT ENGINES

(71) Applicant: General Electric Company, Schenectady, NY (US)

(72) Inventors: Eduardo Aguilar Armendariz, Queretaro (MX); Pamela M. Boehm, Cincinnati, OH (US); Kanahayya Dudhale, Bangalore (IN); Shivam Mittal, Bangalore (IN); William J. Simpson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 584 days.

(21) Appl. No.: 17/490,436

(22) Filed: Sep. 30, 2021

(65) Prior Publication Data
US 2023/0012799 A1    Jan. 19, 2023

(30) Foreign Application Priority Data
Jul. 19, 2021 (IN) .............................. 202111032373

(51) Int. Cl.
| | |
|---|---|
| F01D 5/10 | (2006.01) |
| F01D 5/02 | (2006.01) |
| F01D 21/00 | (2006.01) |
| G01H 1/00 | (2006.01) |
| G01M 1/02 | (2006.01) |
| G01M 1/32 | (2006.01) |
| G06N 20/00 | (2019.01) |

(52) U.S. Cl.
CPC ............. *F01D 5/027* (2013.01); *G01H 1/006* (2013.01); *G01M 1/02* (2013.01); *G01M 1/32* (2013.01); *F05D 2220/323* (2013.01); *G06N 20/00* (2019.01)

(58) Field of Classification Search
CPC .......... F01D 5/027; G01H 1/006; G01M 1/02; G01M 1/32; G06N 20/00; F05D 2220/323
See application file for complete search history.

(56) References Cited

U.S. PATENT DOCUMENTS

| | | |
|---|---|---|
| 5,796,612 A | 8/1998 | Palmer |
| 6,253,126 B1 | 6/2001 | Palmer |
| 6,927,550 B2 | 8/2005 | Tamisier et al. |
| 7,013,210 B2 | 3/2006 | McBrien et al. |

(Continued)

*Primary Examiner* — Jennifer Bahls
*Assistant Examiner* — Quang X Nguyen
(74) *Attorney, Agent, or Firm* — Dority & Manning, P.A.

(57) ABSTRACT

A system and method for reducing the vibration response of a rotating system are provided. In one aspect, an optimized balance shot or solution that indicates one or more physical locations at which one or more balancing weights are to be added or removed from the rotating system is generated. The balance shot is generated based on a transfer function that is customized specifically for the rotating system. The transfer function is generated by applying one or more machine-learned models to parameter values for parameters that are associated with the rotating system. The machine-learned models can generate main effects plots, and from the plots, an effective set of parameter values can be determined. The transfer function can be generated using the effective set of parameter values so that the transfer function used to generate the balance shot is optimized specifically for the rotating system undergoing the balancing process.

18 Claims, 6 Drawing Sheets

(56) References Cited

U.S. PATENT DOCUMENTS

| | | |
|---|---|---|
| 8,572,009 B2 | 10/2013 | Harris |
| 9,347,321 B2 | 5/2016 | Heidari et al. |
| 9,758,243 B1 | 9/2017 | Potts et al. |
| 10,054,043 B2 | 8/2018 | Matthews et al. |
| 10,181,267 B2 | 1/2019 | Karunakar et al. |
| 10,239,635 B2* | 3/2019 | Nakhjavani .............. G01M 1/32 |
| 10,343,784 B2 | 7/2019 | Nakhjavani |
| 10,414,507 B2 | 9/2019 | Schelfaut |
| 2005/0149234 A1 | 7/2005 | Vian et al. |
| 2009/0169384 A1 | 7/2009 | Storace et al. |
| 2016/0032725 A1 | 2/2016 | Heidari et al. |
| 2017/0234233 A1* | 8/2017 | Schwarz ................... F02C 7/06 60/204 |
| 2018/0268257 A1* | 9/2018 | Ren ......................... G06T 7/001 |
| 2018/0354630 A1 | 12/2018 | Nakhjavani |
| 2018/0354646 A1 | 12/2018 | Nakhjavani |
| 2018/0371914 A1* | 12/2018 | Karigiannis ............ F01D 5/005 |
| 2019/0301300 A1 | 10/2019 | Chiasson et al. |
| 2019/0316287 A1* | 10/2019 | Dedow ................... D06F 34/16 |
| 2020/0271011 A1* | 8/2020 | Comandore ............ F01D 19/02 |
| 2020/0284265 A1* | 9/2020 | Reepmeyer ............ G06N 3/045 |

\* cited by examiner

VIBRATION RESPONSE REDUCTION FOR AIRCRAFT ENGINES

PRIORITY INFORMATION

The present application claims priority to Indian Patent Application Number 202111032373 filed on Jul. 19, 2021.

FIELD

The present subject matter relates generally to systems and methods for balancing rotating machinery to reduce or minimize vibrations. More particularly, the present subject matter relates to systems and methods for balancing rotating systems of gas turbine engines.

BACKGROUND

Turbomachines typically include one or more rotating systems. For instance, some aviation gas turbine engines include a high-pressure rotating system and a low-pressure rotating system. The rotating systems can include a number of rotating elements. Particularly, the high-pressure rotating system can include an upstream rotating multi-stage compressor connected to a downstream multi-stage turbine by a high pressure shaft. Similarly, the low-pressure rotating system can include an upstream rotating multi-stage compressor or booster connected to a downstream multi-stage turbine by a low pressure shaft. A fan can be connected to the low pressure shaft as well. As will be appreciated, it is difficult to manufacture and/or assemble such rotating systems to be balanced. Vibrations caused by rotating system imbalance can lead to wear and fatigue of components of the rotating system and surrounding structures and can increase the noise generated therefrom, which is undesirable.

To reduce vibrations caused by imbalance of a rotating system, after manufacture and/or after assembly of an aviation gas turbine engine, such rotating systems typically undergo an engine balancing process in which one or more balancing masses are affixed to some component of a rotating system and/or surrounding structure. Conventionally, to determine the mass and position to affix the balancing masses, vibration data associated with the engine is collected and generalized sensitivity factors are utilized to predict or derive the mass and position of the balancing masses. Predicting the mass and angular position of the balancing masses to reduce the vibration level of the rotating system within acceptable limits can be challenging. In instances where the predictions are less than ideal, multiple iterations of the balancing process or "balance shots" are required to balance the rotating system. This can be a time and labor intensive process.

Accordingly, systems and methods that address one or more of the challenges noted above would be useful.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The singular forms "a", "an", and "the" include plural references unless the context clearly dictates otherwise. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values.

Aspects of the present disclosure are directed to systems and methods for reducing the vibration response of a rotating system, such as a rotating system of an aviation gas turbine engine. Particularly, the systems and methods provided herein generate an optimized balance shot or solution that indicates one or more physical locations at which one or more balancing weights are to be added or removed from the rotating system. By adding or removing balancing weights to and/or from the rotating system at select physical locations, the vibration response of the rotating system can be reduced within an acceptable limit.

In one example aspect, to generate an optimized balance shot, a system receives data that includes a variety of parameter values for parameters associated with the rotating system. The parameter values are input into one or more machine-learned models of the system, such as a least squares optimization machine-learned model. Example parameters can include engine operating parameters, assembly parameters, usage parameters, environmental parameters, and/or life cycle parameters associated with the rotating system. The system applies the one or more machine-learned models to generate a main effects plot for the parameters. From these main effects plots, the system can learn which parameters or parameter values have an effect on the balancing shot and which parameters do not by looking at the dispersion in the data. Parameter values that have an effect on the balancing shot are selected for inclusion in an effective set of parameter values. Parameter values that do not have an effect or that have a negligible effect are not selected for inclusion in the effective set of parameter values.

The system applies the one or more machine-learned models to the parameter values included in the effective set of parameter values to generate a transfer function specific to the rotating system. The transfer function can be an optimized engine specific non-linear self-learning transfer function that accounts for all the parameter values included in the effective set of parameter values. In this regard, the transfer function can account for or be based on engine operating parameters, assembly parameters, usage parameters, environmental parameters, and life cycle parameters, or any combination of the foregoing. The one or more machine-learned models can generate an optimized balance shot based at least in part on the transfer function. Using the balance shot, an operator or machine can affix and/or remove one or more balancing weights to/from the rotating system. In this way, as noted, the vibration response of the rotating system can be brought within an acceptable limit.

Figure 1:
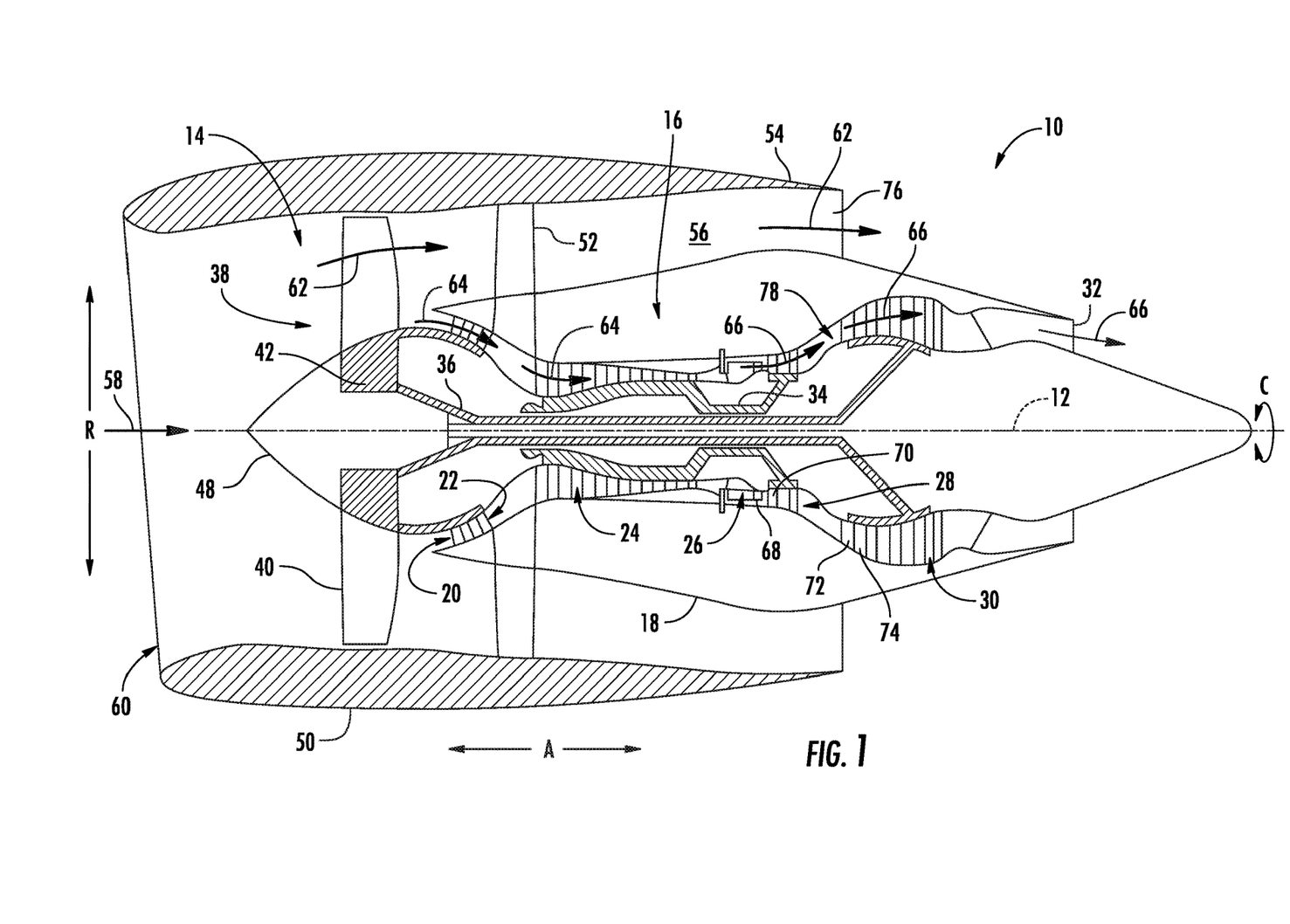
FIG. 1 provides a schematic cross-sectional view of an aviation gas turbine engine according to one example embodiment of the present subject matter.

Turning now to drawings, FIG. 1 provides a schematic cross-sectional view of an aviation gas turbine engine according to one example embodiment of the present subject matter. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends along the axial direction A for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a fan section 14 and a core engine 16 disposed downstream of the fan section 14. The core engine 16 includes a substantially tubular engine cowl 18 that defines an annular core inlet 20. As schematically shown in FIG. 1, the engine cowl 18 encases, in serial flow relationship, a compressor section including a booster or low pressure (LP) compressor 22 followed downstream by a high pressure (HP) compressor 24; a combustion section 26; a turbine section including an HP turbine 28 followed downstream by an LP turbine 30; and a jet exhaust nozzle section 32. The compressor section, combustion section 26, turbine section, and nozzle section 32 together define a core air flowpath. An HP shaft 34 drivingly connects the HP turbine 28 to the HP compressor 24 to rotate them in unison concentrically with respect to the longitudinal centerline 12. An LP shaft 36 drivingly connects the LP turbine 30 to the LP compressor 22 to rotate them in unison concentrically with respect to the longitudinal centerline 12. The HP and LP shafts 34, 36 are each rotating components, rotating about the axial direction A during operation of the turbofan 10. The turbofan 10 can include a plurality of bearings to support such rotating components.

The HP shaft 34, the rotating components of the HP compressor 24, and the rotating components of the HP turbine 28 collectively form a first rotating system or HP spool. The LP shaft 36, the rotating components of the LP compressor 22, and the rotating components of the LP turbine 30 collectively form a second rotating system or LP spool. As will be explained herein, rotating systems, such as the LP and/or HP spools, can undergo one or more balancing operations to reduce the vibration response thereof.

The fan section 14 includes a fan 38 having a plurality of fan blades 40 coupled to a disk 42 in a spaced apart manner. The fan blades 40 extend outward from the disk 42 along the radial direction R. The fan blades 40 and the disk 42 are together rotatable about the longitudinal axis 12. The disk 42 is covered by a rotatable spinner 48 aerodynamically contoured to promote an airflow through the plurality of fan blades 40. In addition, the fan section 14 includes an annular fan casing or outer nacelle 50 that circumferentially surrounds the fan 38 and/or at least a portion of the core engine 16. The nacelle 50 is supported relative to the core engine 16 by a plurality of circumferentially-spaced outlet guide vanes 52. Alternatively, the nacelle 50 also may be supported by struts of a structural fan frame. Moreover, a downstream section 54 of the nacelle 50 extends over an outer portion of the core engine 16 so as to define a bypass airflow passage 56 therebetween.

During operation of the turbofan 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or more specifically into the annular core inlet 20 of the LP compressor 22. The pressure of the second portion of air 64 is then increased as it is routed through the high pressure (HP) compressor 24. The high pressure air 64 is then discharged into the combustion section 26 where the air 64 is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the engine cowl 18 and HP turbine rotor blades 70 that are coupled to the HP shaft 34, thus causing the HP shaft 34 to rotate, thereby supporting operation of the HP compressor 24. The combustion gases 66 then flow downstream into and expand through the LP turbine 30 where a second portion of thermal and kinetic energy is extracted from the combustion gases 66 via sequential stages of LP turbine stator vanes 72 that are coupled to the engine cowl 18 and LP turbine rotor blades 74 that are coupled to the LP shaft 36, thus causing the LP shaft 36 to rotate, thereby supporting operation of the LP compressor 22 and rotation of the fan 38.

The combustion gases 66 are subsequently routed through the jet exhaust nozzle section 32 of the core engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core engine 16.

It should be appreciated that the exemplary turbofan 10 depicted in FIG. 1 is by way of example only, and that in other exemplary embodiments, the turbofan 10 may have any other suitable configuration. For example, in other exemplary embodiments, the fan 38 may be configured in any other suitable manner (e.g., as a variable pitch fan) and further may be supported using any other suitable fan frame configuration. Moreover, it also should be appreciated that in other exemplary embodiments that any other suitable HP compressor 24 and HP turbine 28 configurations may be utilized. It also should be appreciated, that in still other exemplary embodiments, aspects of the present disclosure may be incorporated into any other suitable type of gas turbine engine. For example, aspects of the present disclosure may be incorporated into, e.g., a turboshaft engine, turboprop engine, turbojet engine, industrial and marine gas turbine engines, auxiliary power units, etc. Further, aspects of the present disclosure may be incorporated into any suitable turbomachine or device having at least one rotating system.

Figure 2:
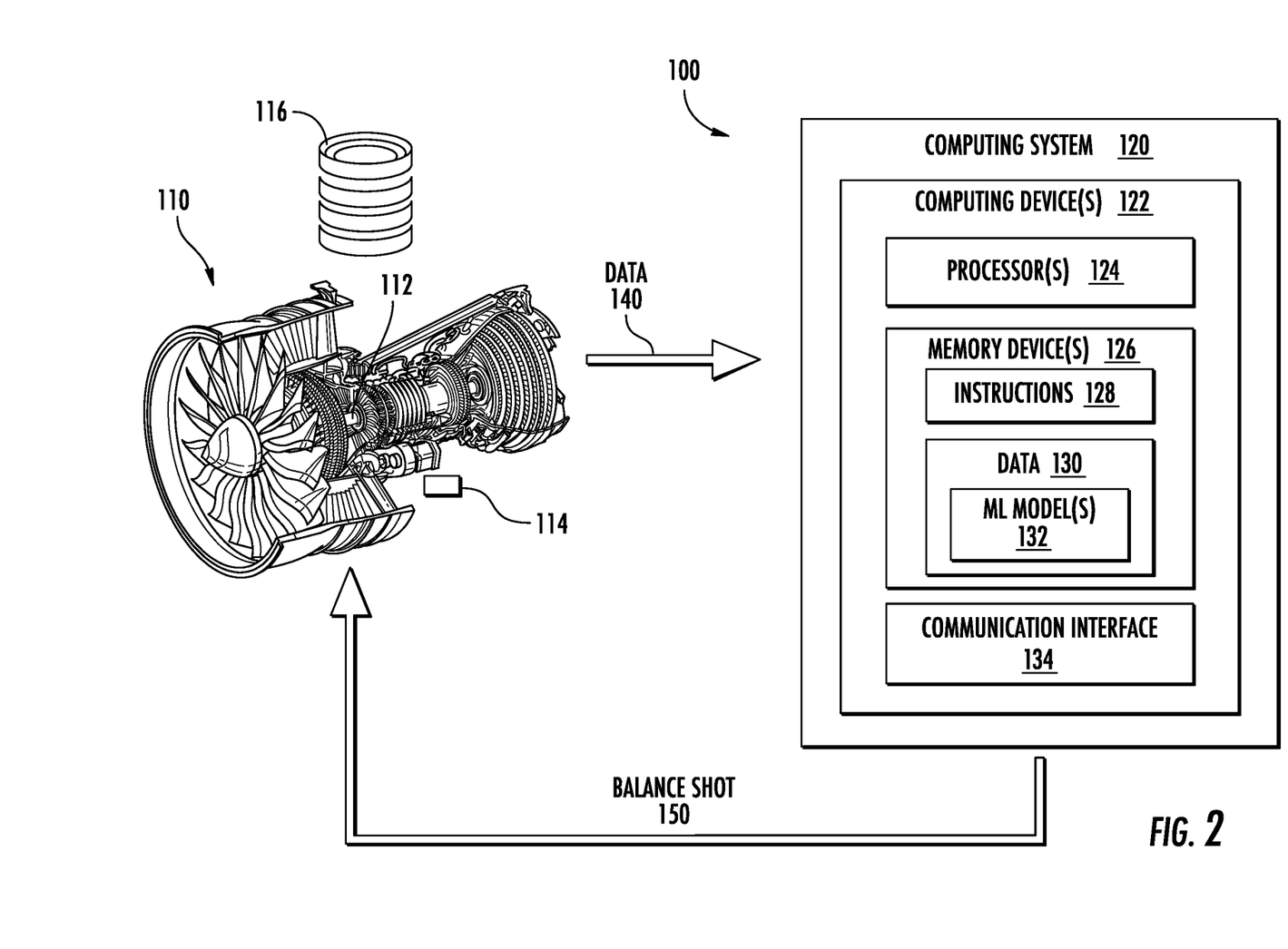
FIG. 2 provides a system diagram of a rebalancing system according to one example embodiment of the present subject matter.

FIG. 2 provides a system diagram of a balancing system 100 according to one example embodiment of the present subject matter. Generally, the balancing system 100 is operable to generate a balance shot for a rotating system. For this embodiment, the balancing system 100 is operable to generate a balance shot for a rotating system 112 of a gas turbine engine 110, which is depicted as an aviation turbofan in FIG. 2. In this regard, the gas turbine engine 110 can be configured in the same or similar manner as the turbofan 10 of FIG. 1, for example. Moreover, for this embodiment, the rotating system 112 is the LP spool of the gas turbine engine 110. While the balancing system 100 shown in FIG. 2 is depicted as being operable to generate balance shots for balancing the rotating system 112 of the gas turbine engine 110, it will be appreciated that the balancing system 100 can be used to balance other rotating systems, such as rotating systems of other aviation gas turbine engines, other turbomachines generally, as well as other machines or devices having a rotating system.

A balance shot, also referred herein as a balance solution, is a balancing plan that indicates one or more physical locations at which one or more balancing weights are to be added or removed from a rotating system so as to minimize and/or reduce the vibration response of the rotating system. The balance shot can indicate the mass and position of each of the balancing weights. As one example, a balance shot can indicate the selection of one or more balancing screws selected from a set of screws of different standard mass to thread or otherwise apply into respective holes defined by the rotating system. By applying and/or removing balancing weights to/from the rotating system, a center of gravity of the rotating system can be moved closer to the axis of rotation than was the case without balancing. In this regard, the vibration response of the rotating system can be reduced to an acceptable level.

As shown in FIG. 2, the balancing system 100 includes a computing system 120. The computing system 120 is one example computing system suitable for implementing the computing elements of the balancing system 100. The computing system includes one or more processors 124 and one or more memory devices 126. The one or more processors 124 and one or more memory devices 126 can be embodied in one or more computing devices 122. The one or more processors 124 can include any suitable processing device, such as a microprocessor, microcontroller, integrated circuit, logic device, or other suitable processing device. The one or more memory devices 126 can include one or more computer-readable medium, including, but not limited to, non-transitory computer-readable medium or media, RAM, ROM, hard drives, flash drives, and other memory devices, such as one or more buffer devices.

The one or more memory devices 126 can store information accessible by the one or more processors 124, including computer-readable or computer-executable instructions 128 that can be executed by the one or more processors 124. The instructions 128 can be any set of instructions that, when executed by the one or more processors 124, cause the one or more processors 124 to perform operations, such as the operations described herein. The instructions 128 can be software written in any suitable programming language or can be implemented in hardware. The instructions 128 can be any of the computer-executable instructions noted herein. The one or more memory devices 126 can further store data 130 that can be accessed by the one or more processors 124. The data 130 can include received data, such as data 140 associated with the gas turbine engine 110, or more specifically, the rotating system 112 thereof. The data 130 can include one or more tables, functions, algorithms, models, equations, etc. according to example embodiments of the present subject matter. For instance, as shown in FIG. 2, the data 130 can include one or more machine-learned models 132. The one or more machine-learned models 132, as will be explained herein, can be trained to generate balance shots for balancing the rotating system 112 of the gas turbine engine 110.

The computing system 120 can also include a communication interface 134. The communication interface 134 can be embodied in the one or more computing devices 122. The communication interface 134 can be used to communicate, for example, with other components or systems, such as maintenance systems, aircraft systems, weather systems, etc. The communication interface 134 can include any suitable components for interfacing with one or more networks, including for example, transmitters, receivers, ports, controllers, antennas, or other suitable components.

As further shown in FIG. 2, the computing system 120 is configured to receive data 140. The received data 140 can be stored as data 130. The data 140 can include various types of data and can be received from various sources, such as from one or more sensors 114 of the gas turbine engine 110 and/or from one or more data stores 116. The one or more data stores 116 can include one or more data stores located onboard of the aircraft to which the gas turbine engine 110 is mounted or can be located offboard. The one or more sensors 114 are operable to measure or sense parameter values for operating parameters and/or operating conditions associated with the gas turbine engine 110. The one or more data stores 116 can store such parameter values and can store other useful data relating to balancing of the rotating system 112, such as assembly data, as will be explained below.

Figure 3:
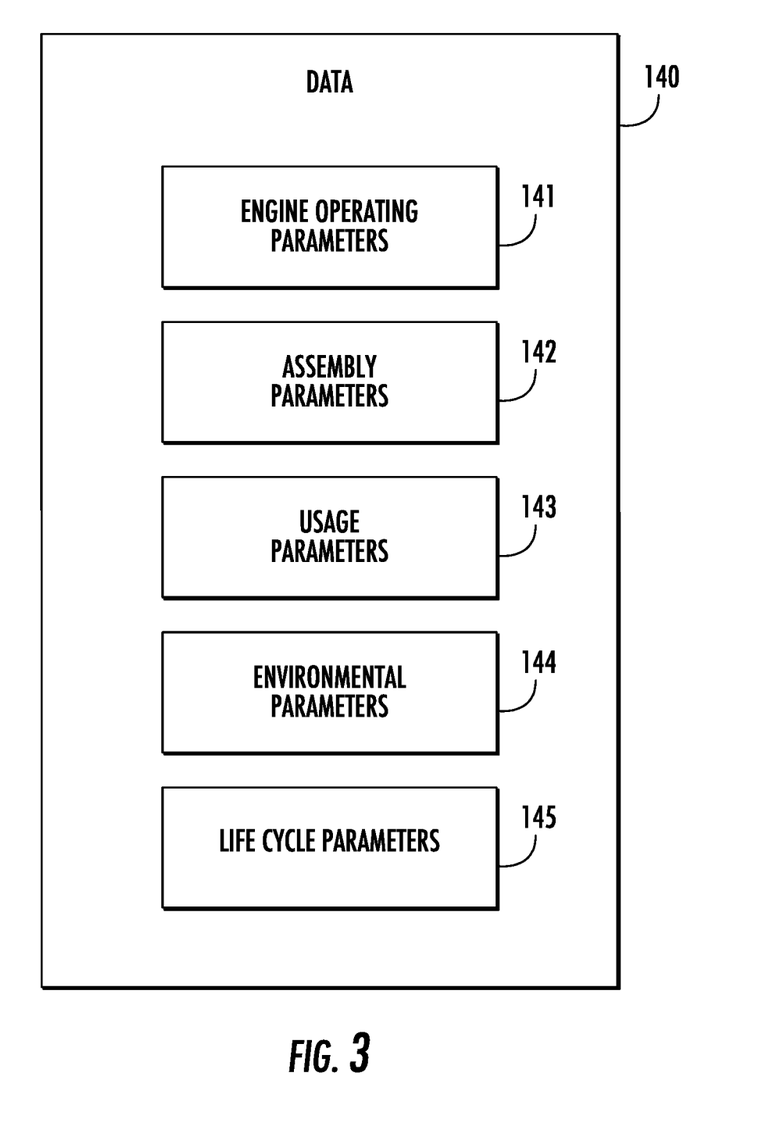
FIG. 3 provides a block diagram of example data that can be received by a computing system of the balancing system of FIG. 2.

With reference now to FIGS. 2 and 3, FIG. 3 provides a block diagram of example data 140 that can be received by the computing system 120. As depicted, the data 140 can include various types of data, including engine operating data, assembly data, usage data, environmental data, and/or life cycle data.

The engine operating data of the data 140 can include parameter values for one or more engine operating parameters 141. Example engine operating parameters 141 for which parameter values can be sensed other otherwise calculated based on such sensed parameter values can include, without limitation, rotor or spool speed, including the low pressure spool speed N1 and/or the high pressure or core spool speed N2, the oil temperature and/or oil pressure, parameters associated with vibration of the engine, including a vibration response of the engine, phase angle, mode position of one or more rotors or spools, and/or vibration variations, the exhaust gas temperature of the engine, cold clearances between rotating and stationary components, parameters associated with acceleration and deceleration of the engine, including the number of accelerations and/or decelerations over a magnitude threshold and/or rate of acceleration and/or deceleration, the compressor inlet pressure and temperature, the compressor discharge pressure, and/or the temperature at the inlet or outlet of the combustor. The engine operating data can include parameter values for other engine operating parameters 141 as well.

As noted above, the data 140 can also include assembly data. The assembly data can include parameter values for assembly parameters 142 associated with assembly of the rotating system 112 of the gas turbine engine 110. Example assembly parameters 142 can include, without limitation, the assembly method used to assemble the rotating system and/or the gas turbine engine 110, the operators who assembled the rotating system and/or the gas turbine engine 110, the assembly line and/or assembly facility along which or at which the rotating system and/or the gas turbine engine 110 was assembled, and/or one or more parts or components included within the rotating system 112 that were provided by an entity other than the entity that manufactured the rotating system. Other example parameters can include, without limitation, residual unbalance of the rotating system 112, fan blade mapping, and/or a spool or rotor concentricity of the rotating system 112 sensed and/or calculated upon assembly. In addition, the assembly data can include historical balance data and historical transfer functions.

Further, the assembly data can include parameter values for assembly parameters 142 that indicate the ambient conditions present during assembly of the rotating system 112 of the gas turbine engine 110. Example assembly parameters 142 associated with the ambient conditions present during assembly of the rotating system 112 of the gas turbine engine 110 can include, without limitation, a weather season in which the rotating system 112 was assembled (i.e., spring, summer, fall, winter), a weather condition present during assembly of the rotating system 112 (e.g., a humidity, temperature, etc. of the air within and/or outside of the facility in which the rotating system is manufactured), and/or the time of day in which the rotating system 112 was assembled.

The data 140 received by the computing system 120 can also include other types of data as well. For instance, as shown in FIG. 3, the data 140 can also include usage data. Particularly, the data 140 can include parameter values for usage parameters 143 that indicate how the gas turbine engine 110 has been utilized in the field. As one example, the usage parameters 143 can indicate one or more geographic locations in which the gas turbine engine 110 has operated, such as a flight operating area, and/or altitudes, latitudes, longitudes, etc. at which the gas turbine engine 110 operated. As another example, the usage parameters 143 can indicate engine usage variation (e.g., short/long cycles, redlining, pilot variations, etc.). As a further example, the usage parameters 143 can indicate one or more discrete incidents that occurred during use of the gas turbine engine 110. For instance, the usage parameters 143 can indicate if the gas turbine engine 110 has been subjected to a bird strike, dust amounts of above a threshold, ingestion of Foreign Object Debris (FOD), icing, ice crystal icing, water washes, foam washes, etc.

The data 140 received by the computing system 120 can also include environmental data and/or life cycle data. Specifically, the data 140 can include parameter values for environmental parameters 144 that indicate the ambient conditions present during operation of the gas turbine engine 110. Such environmental parameters 144 can include, without limitation, humidity, ambient temperature, precipitation, lightning strikes, seasonal variations, etc. In addition, the data 140 can include parameter values for life cycle parameters 145 associated with life cycle events of the rotating system 112 and/or the gas turbine engine 110, including shop visits, repairs, overhauls, etc.

As noted above, the computing system 120 can generate a balance shot 150 that provides an optimized balancing solution to minimize and/or reduce the vibration response of the rotating system 112. The balance shot 150 can indicate one or more physical locations at which one or more balancing weights are to be added or removed from the rotating system 112. As will be explained further below, the balance shot 150 is generated using an optimized engine specific non-linear self-learning transfer function that is generated by applying one or more machine-learned models on the received data 140. The self-learning transfer function accounts for a variety of parameters, such as engine operating parameters 141, including a rotor vibration response and mode, oil properties, assembly parameters 142, usage parameters 143, environmental parameters 144, life cycle parameters 145, and/or other parameters associated with the gas turbine engine 110 and/or the rotating system 112.

Figure 4:
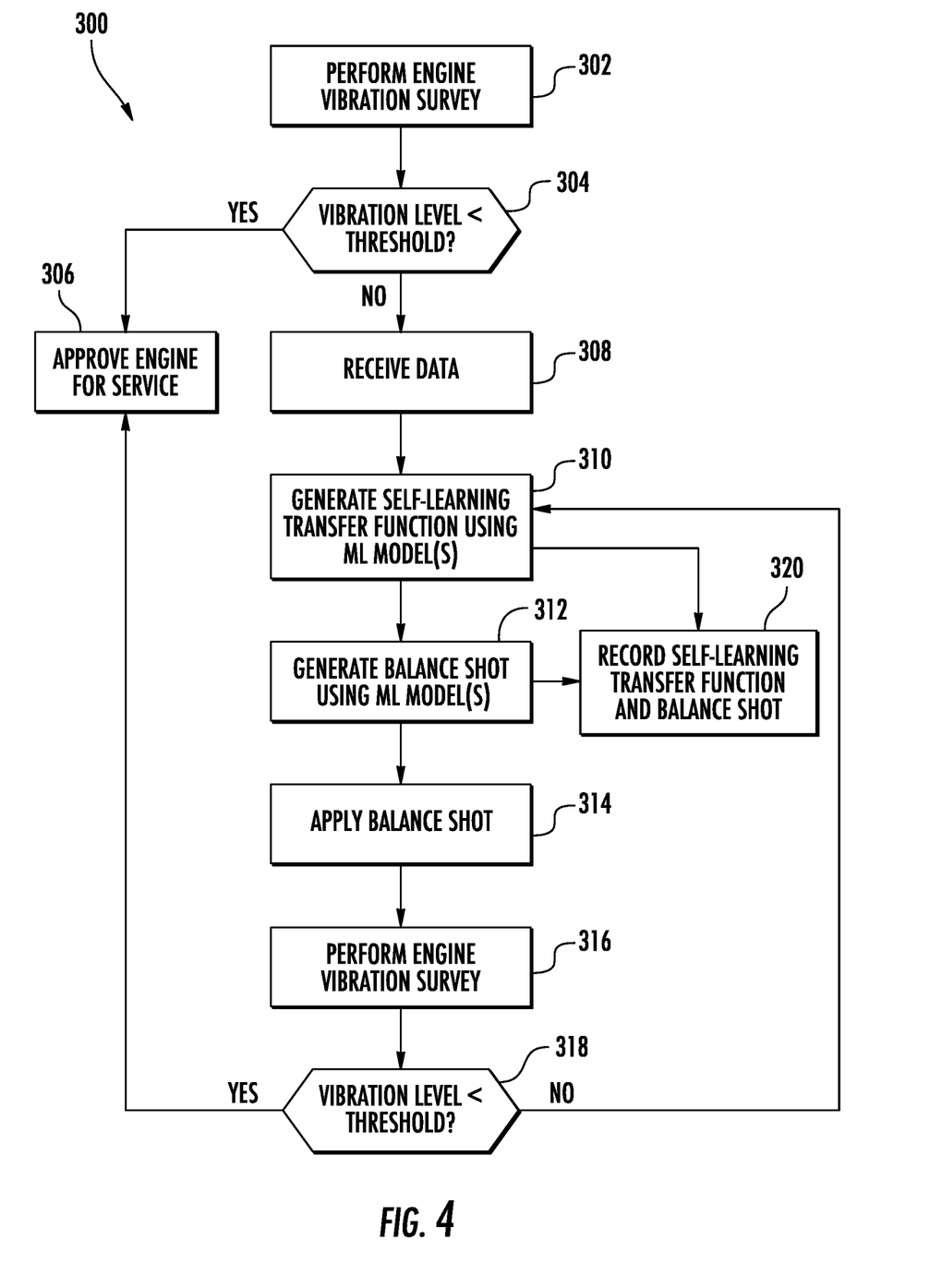
FIG. 4 provides a flow diagram of an example method of balancing a rotating system according to one example embodiment of the present subject matter.

With reference now to FIGS. 2, 3, and 4, an example manner in which the balancing system 100 can generate an optimized balance shot 150 that can be used to balance the rotating system 112 of the gas turbine engine 110 will now be provided. FIG. 4 provides a flow diagram for an example method (300) of using the balancing system 100 to generate a balance shot 150 for the rotating system 112 of the gas turbine engine 110 according to one example embodiment of the present subject matter. While the method (300) is provided herein in the context of balancing the rotating system 112 of the gas turbine engine 110, it will be appreciated that the method (300) can be used to generate balance shots for other machines having a rotating system.

At (302), the method (300) includes performing a vibration survey of the rotating system. For instance, performing the vibration survey of the rotating system 112 can include operating the gas turbine engine 110. During operation of the gas turbine engine 110, the one or more sensors 114 (e.g., one or more accelerometers) can sense or measure the vibration level of the rotating system 112. The vibration survey can be conducted while the gas turbine engine 110 is mounted to an aircraft or can be removed from the aircraft and tested in a test cell, for example. In some implementations, the data sensed by the one or more sensors 114 can be recorded and stored on an Electronic Engine Controller (EEC) of the gas turbine engine 110 and then ultimately provided to the computing system 120. In other implementations, the data sensed by the one or more sensors 114 can be routed directly to the computing system 120. Accordingly, in performing the vibration survey of the rotating system 112 at (302), the method (300) can include receiving vibration data indicating the vibration level of the rotating system 112. For instance, the one or more processors 124 of the computing system 120 can receive the vibration data. The received vibration data can indicate the vibration level of the rotating system 112 of the gas turbine engine 110. In some implementations, the vibration data can be received as part of data 140.

At (304), the method (300) includes determining whether the vibration level of the rotating system exceeds a limit. For instance, the one or more processors 124 of the computing system 120 can determine whether the vibration level of the rotating system 112 exceeds a limit. The vibration level can be determined based at least in part on the vibration data captured during the vibration survey at (302). In some implementations, the limit can be agreed upon by an airframe and engine manufacturer. For instance, an airframe and engine manufacturer may agree that all engines built by the engine manufacturer and/or third party assembler must be below a certain vibration level prior to being shipped to the airframe manufacturer for installation on an aircraft. In this regard, the limit can be a "ship limit." As shown in FIG. 4, when the vibration level of the rotating system 112 does not exceed the limit, the method (300) proceeds to (306). Conversely, when the vibration level of the rotating system 112 exceeds the limit, it is determined that the rotating system requires balancing and consequently the method (300) proceeds to (308).

At (306), the method (300) includes approving the gas turbine engine for service. That is, when the vibration level of the rotating system 112 does not exceed or is below the limit as determined at (304), the method (300) includes approving the gas turbine engine for service. In this regard, when approved for service, the gas turbine engine 110 can continue service or can be shipped or otherwise delivered to the airframe manufacturer so that the gas turbine engine 110 can be installed on an aircraft.

At (308), the method (300) includes receiving data that includes parameter values for parameters associated with the rotating system, or more generally, the gas turbine engine. In some implementations, such data can be received in response to whether the vibration level of the rotating system exceeds the limit as determined at (304). For instance, the one or more processors 124 of the computing system 120 can receive the data 140 in response to a determination at (304) that the vibration level of the rotating system exceeds or is above the limit. Generally, the data 140 can include various types of data as noted above. Particularly, the data 140 can include engine operating parameters 141, assembly parameters 142, usage parameters 143, environmental parameters 144, life cycle parameters 145, some combination of the foregoing, etc. The parameter values for the engine operating parameters 141 can indicate the operating conditions of the gas turbine engine 110. Example engine operating parameters 141 can include spool or rotor speed, vibration response and mode location as sensed by a first sensor positioned at a first bearing and a second sensor positioned at a second bearing spaced from the first bearing along the axial direction, acceleration and/or deceleration variation, vibration variation, oil properties, such as pressure and temperature, etc. The parameter values for the assembly parameters 142 can indicate conditions of the rotating system 112 during assembly of the rotating system 112, or more generally, the gas turbine engine 110. The assembly parameters 142 can include the residual unbalance of the rotating system 112, rotor concentricity of the rotating system 112, etc. The data 140 can further include parameter values for usage parameters 143 indicating the manner in which the gas turbine engine 110 has been operated, e.g., in the field. The data 140 can also include parameter values for environmental parameters 144 that indicate the environmental conditions in which the gas turbine engine 110 has operated. In addition, the data 140 can include parameter values for life cycle parameters 145 that indicate events associated with maintenance or servicing of the gas turbine engine 110, such as number of service visits, the type of service visit, whether the engine has been overhauled, etc.

At (310), the method (300) includes generating a self-learning transfer function. For instance, the one or more processors 124 of the computing system 120 can generate the self-learning transfer function by applying the one or more machine-learned models 132 to the parameter values received as part of the data 140. The self-learning transfer function can be generated such that it is specific to the rotating system 112. Stated another way, by applying the one or more machine-learned models 132 to the parameter values specifically associated with the gas turbine engine 110 or rotating system 112, a customized transfer function specifically tailored to the rotating system 112 can be generated. The self-learning transfer function is generated so that an optimal balance shot 150 can be generated to reduce the vibration response of the engine. An example manner in which the self-learning transfer function can be generated is set forth below.

With reference now to FIGS. 2, 3, 4, and 5, FIG. 5 provides an example block diagram of the one or more machine-learned models 132. As depicted best in FIG. 5, the data 140 is input into the one or more machine-learned models 132. The one or more machine-learned models 132 can be structured as any suitable type of machine-learned model. By way of example, the one or more machine-learned models 132 can be or can include a machine or statistical learning model structured as one of a non-linear least squares optimization model, a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing. For this example implementation, the one or more machine-learned models 132 include at least one model structured as a non-linear least squares optimization model.

Figure 5:
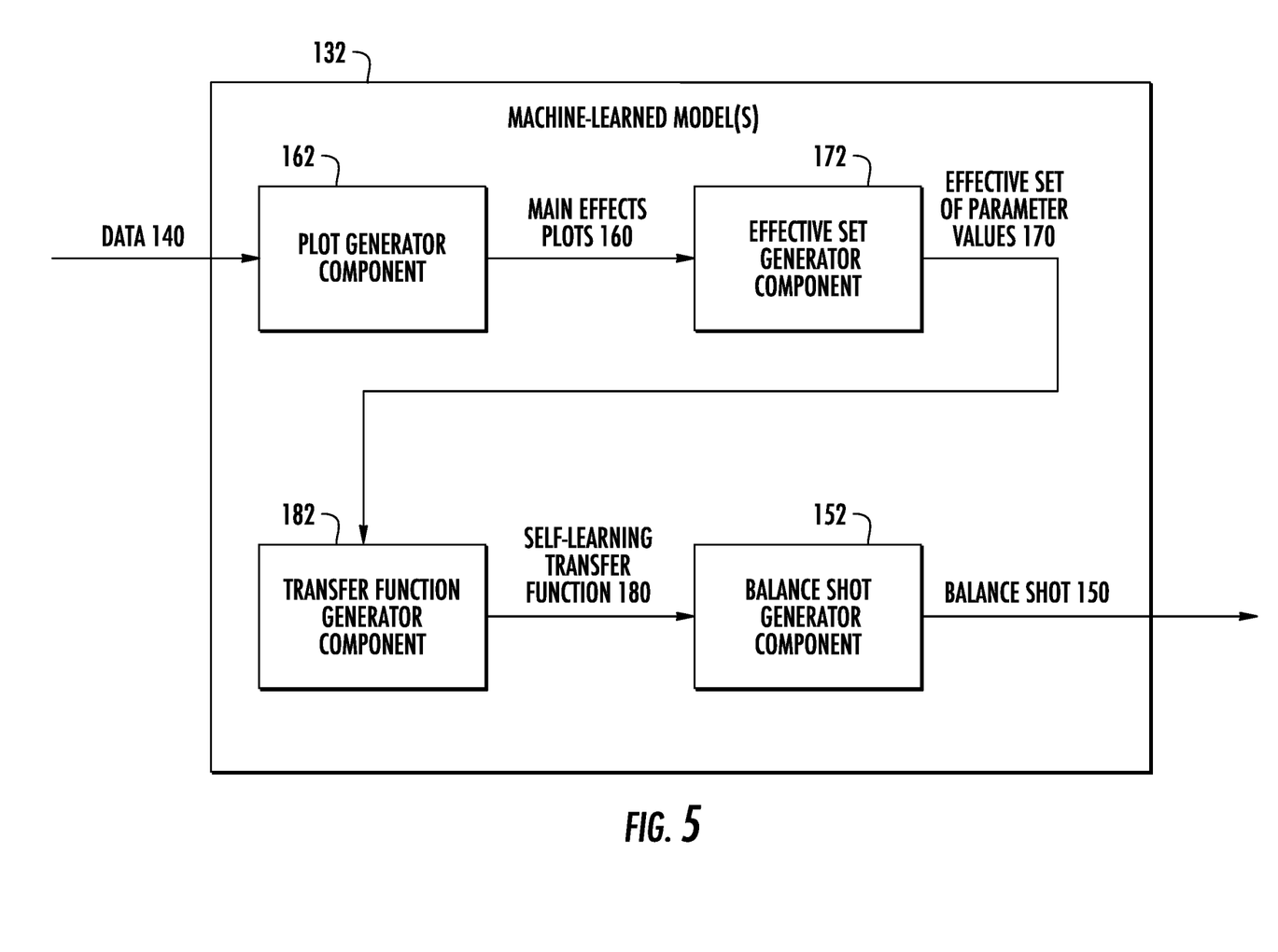
FIG. 5 provides a block diagram of one or more machine-learned models of the balancing system of FIG. 2.

With the data 140 input into the one or more machine-learned models 132, the one or more processors 124 can execute a plot generator component 162 of the one or more machine-learned models 132 to generate main effects plots 160. Main effects plots 160 can be generated for respective ones of the parameters associated with the rotating system 112. For instance, in applying the one or more machine-learned models 132 to the received data 140, the one or more processors 124 can generate a main effects plot for one, some, or all the parameters using their respective parameter values received as part of the data 140. In some implementations, a main effects plot is generated for each parameter provided in the received data 140. In yet other implementations, a main effects plot is generated for some of the parameters provided in the received data 140.

Figure 6:
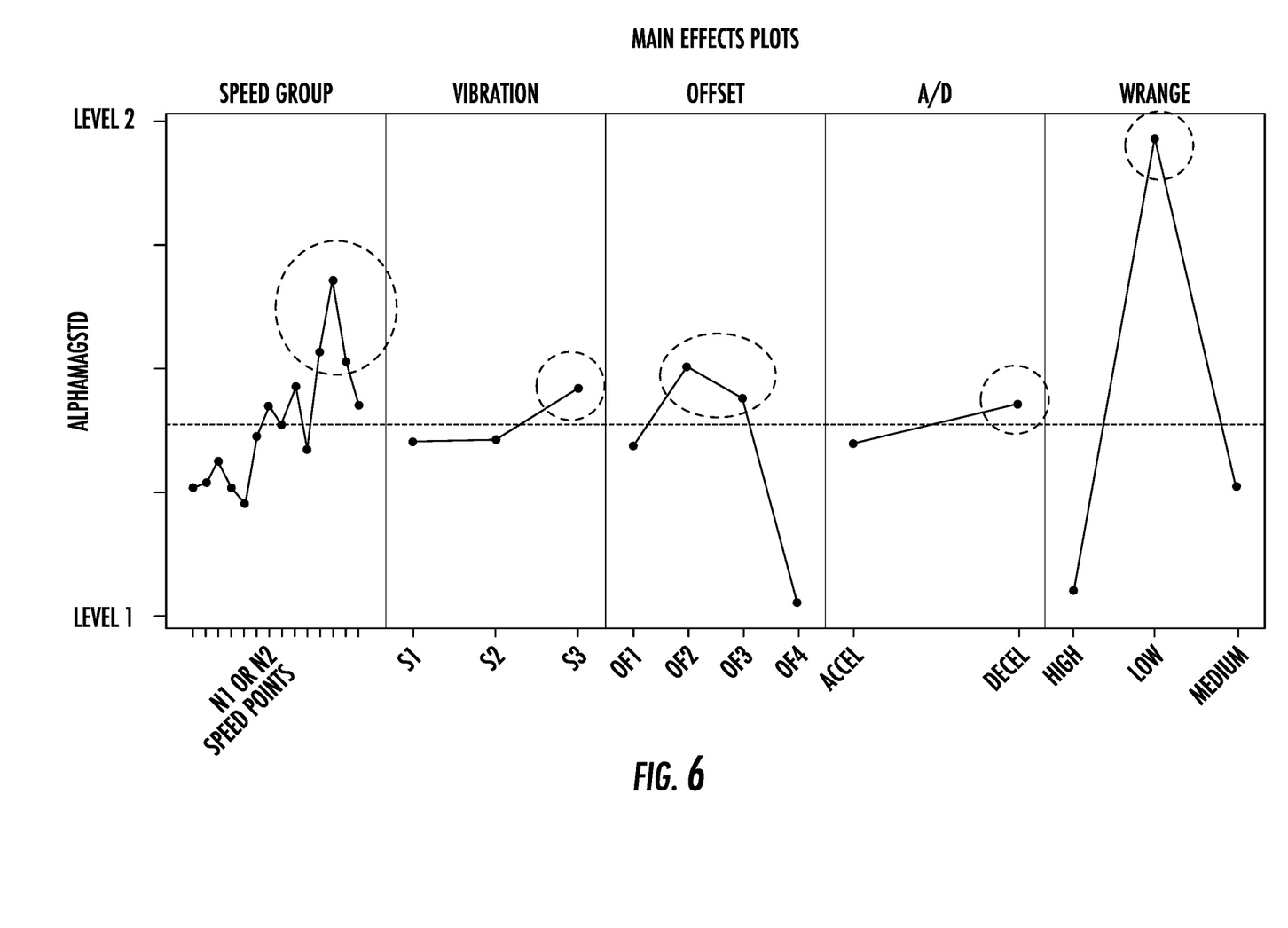
FIG. 6 provides a graph depicting main effects plots generated for a number of parameters according to example aspects of the present subject matter.

By way of example, with reference now to FIGS. 2, 3, 4, 5, and 6, FIG. 6 provides a graph depicting a main effects plot generated for a number of parameters. Particularly, the graph of FIG. 6 depicts the standard deviation magnitude of a given parameter as a function of their respective input parameter values. Particularly, for this example, a main effects plot has been generated for rotor speed or rotational speed of the rotating system 112, vibration at various sensors, offset, acceleration and deceleration, and weight ranges for balance weights.

With the main effects plots 160 generated, the one or more processors 124 can analyze the main effects plots 160. The one or more processors 124 can analyze the main effects plots 160 to identify the parameter values that cause unacceptable levels of dispersion in the data 140. For instance, where standard deviation is used as the measure of dispersion, the one or more processors 124 can identify parameter values that deviate from their respective means by an associated threshold. Generally, parameter values that introduce more dispersion in the data 140 are not effective parameter values for generating a balance shot. The one or more processors 124 can analyze the main effects plots 160 by executing the effective set generator component 172 of the one or more machine-learned models 132. In executing the effective set generator component 172, the one or more processors 124 can generate or select an effective set of parameter values 170 based at least in part on the main effects plots generated for the parameters. One or more speed data clustering algorithms can be used in identifying or otherwise selecting the effective set of parameter values 170. In some implementations, the self-learning transfer function 180 specific to the rotating system 112 is generated by applying the one or more machine-learned models 132 based at least in part on the parameter values selected for inclusion in the effective set of parameter values 170 and not the parameter values not selected for the effective set of parameter values 170. In this manner, the self-learning transfer function 180 can be generated using only effective parameter values.

In some implementations, selecting, by the one or more processors 124, the effective set of parameter values 170 based at least in part on the main effects plots 160 generated for the parameters includes determining, by the one or more processors 124, which parameter values are within their respective dispersion thresholds, e.g., within a deviation threshold from the mean set or learned for the parameter under consideration. In such implementations, the parameter values within their respective dispersion thresholds are selected for inclusion in the effective set of parameter values 170 while the parameter values not within their respective dispersion thresholds are not selected for inclusion in the effective set of parameter values 170.

As shown in the main effects plots of FIG. 6, some parameter values for rotor speed, vibration data from some sensors, some offsets, some deceleration data, and some possible weights for balancing weights would not be effective in generating a balance shot for the particular rotating system 112 of the gas turbine engine 110 as they introduce unacceptable levels of dispersion. Accordingly, based on the analysis of the main effects plots 160, the one or more processors 124 can determine the effective set of parameter values 170 for parameters that may be used to generate the self-learning transfer function 180. As noted above, the parameter values found to introduce unacceptable levels of dispersion can be excluded from the effective set of parameter values 170, and conversely, the parameter values found to introduce acceptable levels of dispersion can be included in the effective set of parameter values 170.

For the speed group main effects plot of FIG. 6, a number of points circled in FIG. 6 corresponding to rotor speed values were identified as deviating from the mean by a speed threshold. The rotor speed values identified as not deviating from the mean by the speed threshold are not circled. The rotor speed values can correspond to the LP spool (N1), the HP spool (N2), or some other spool within the engine.

For the vibration main effects plot of FIG. 6, which captures vibration levels captured by sensors positioned at different axial locations along the spool, a point (circled in FIG. 6) corresponding to vibration values captured by a third vibration sensor S3 was identified as deviating from the mean by a vibration threshold. Points corresponding to vibration values captured by a first vibration sensor S1 and a second vibration sensor S2 were identified as being within an acceptable deviation from the mean, and thus, such values are within the vibration threshold. Accordingly, the values captured by the first and second vibration sensors S1, S2 are not circled in FIG. 6.

For the offset main effects plot of FIG. 6, points (circled in FIG. 6) corresponding to a Second Offset (OF2) and a Third Offset (OF3) were identified as deviating from the mean by an offset threshold. Points corresponding to a First Offset (OF1) and a Fourth Offset (OF4) were identified as being within an acceptable deviation from the mean, and thus, such values are within the offset threshold.

For the acceleration/deceleration main effects plot of FIG. 6, points circled in FIG. 6 corresponding to a deceleration event (denoted as DECEL) were identified as deviating from the mean by an accel/decel threshold. Points corresponding to an acceleration event (denoted as ACCEL) were identified as being within an acceptable deviation from the mean, and thus, such values are within the accel/decel threshold.

For the balance weight main effects plot of FIG. 6, points (circled in FIG. 6) corresponding to a low weight (denoted as LOW) were identified as deviating from the mean by a weight threshold. Points corresponding to a High (denoted as HIGH) and Medium (denoted as MEDIUM) were identified as being within an acceptable deviation from the mean, and thus, such values are within the weight threshold. It will be appreciated that, in applying the one or more machine-learned models 132, the one or more processors 124 can analyze the main effects plots of other parameters as well.

After learning which parameter values would make a more effective balance shot for the rotating system 112 of the gas turbine engine 110 and generating the effective set of parameter values 170 using such effective parameter values, the one or more processors 124 can generate the self-learning transfer function 180. The one or more processors 124 can generate the self-learning transfer function 180 by executing a transfer function generator component 182 of the one or more machine-learned models 132. In executing the transfer function generator component 182, the one or more processors 124 can generate the self-learning transfer function 180 based at least in part on the effective set of parameter values 170. Particularly, the parameter values of the effective set of parameter values 170 can be used as coefficients in generating the self-learning transfer function 180. The parameter values excluded from the effective set of parameter values 170 can be set to zero so that such parameter values are not included in the generation of the self-learning transfer function 180. The self-learning transfer function 180 is self-learning in that it is generated based on parameter values that have been learned or determined to be effective while excluding those determined to be ineffective. Moreover, notably, the self-learning transfer function 180 accounts for all parameter values found to be effective, making the self-learning transfer function 180 an optimized function that can be used to generate an optimal balance shot 150 for the rotating system 112 of the gas turbine engine 110.

At (312), the method (300) includes generating a balance shot based at least in part on the self-learning transfer function. More specifically, the method (300) can include generating, by the one or more processors, a balance shot as an output of the one or more machine-learned models based at least in part on the transfer function specific to the rotating system. The balance shot can indicate one or more physical locations at which one or more balancing weights are to be added or removed from the rotating system.

For instance, the one or more processors 124 of the computing system 120 can generate the balance shot 150 based at least in part on the self-learning transfer function 180. In some implementations, the one or more processors 124 can apply the one or more machine-learned models 132 to generate the balance shot 150 based at least in part on the self-learning transfer function 180. The self-learning transfer function 180 can suggest or estimate an optimal balance shot 150. Particularly, the one or more processors 124 can generate the balance shot 150 by executing a balance shot generator component 152 of the one or more machine-learned models 132. In executing the balance shot generator component 152, the one or more processors 124 can generate the balance shot 150 based at least in part on the self-learning transfer function 180.

The generated balance shot 150 can indicate one or more physical locations at which one or more balancing weights are to be added or removed from the rotating system 112. Particularly, the balance shot 150 can indicate both a mass and a circumferential location of each of the balancing weights to be added or removed from the rotating system 112. As one example, the rotating system 112 can define one or more arrays of holes. The arrays can be spaced from one another along an axial direction. The holes of a given array can be spaced from one another along a circumferential direction. For instance, the holes of a given array can be spaced evenly from one another around the circumference of a shaft of the rotating system 112. The balance shot 150, or balancing solution, can indicate the axial and circumferential location (e.g., by specifying a particular hole of an array) as well as the mass of the balancing weight to add to or remove from the shaft of the rotating system 112.

At (314), the method (300) includes applying the balance shot to the rotating system. For instance, a machine or operator can attach or remove one or more balancing weights to or from the rotating system 112 based at least in part on the balance shot 150 determined at (312). As one example, an operator or machine can affix (e.g., threading engage) one or more balancing weights to the rotating system 112 at select physical locations in accordance with the balance shot 150. As another example, an operator or machine can remove one or more balancing weights (or other component or section) from the rotating system 112 in accordance with the balance shot 150. In this way, the vibration response of the rotating system 112 can be reduced to an acceptable vibration level.

At (316), the method (300) includes performing an after-balancing vibration survey of the rotating system. In this regard, after the rotating system 112 is balanced at (314), the vibration level of the rotating system 112 can be determined. The after-balancing vibration survey of the rotating system 112 can be performed in the same manner as the vibration survey at (302). In performing the after-balancing vibration survey of the rotating system 112 at (316), the method (300) can include receiving vibration data indicating the vibration level of the rotating system. For instance, the one or more processors 124 of the computing system 120 can receive the vibration data. The received vibration data can indicate the vibration level of the rotating system 112 of the gas turbine engine 110.

At (318), the method (300) includes determining whether the vibration level of the rotating system exceeds the limit. Particularly, the vibration level of the rotating system 112 determined at (316) is compared to the limit. In this manner, the vibration level of the rotating system 112 after balancing at (314) is compared to the limit. The limit can be the same limit used at (304), for example. As shown in FIG. 4, when the vibration level of the rotating system 112 does not exceed the limit as determined at (318), the method (300) proceeds to (306). Conversely, when the vibration level of the rotating system 112 exceeds the limit, it is determined that the rotating system requires additional balancing and consequently the method (300) proceeds to (310) so that process can be iterated until the vibration level of the rotating system 112 is below the limit.

At (320), the method (300) includes recording the self-learning transfer function generated at (310) and the balance shot generated at (312). For instance, the one or more processors 124 can record the self-learning transfer function 180 and the balance shot 150 by storing them in one or more suitable memory devices 126. In this way, the one or more processors 124 can access the self-learning transfer function 180 and the balance shot 150 and utilize them to train or update the one or more machine-learned models 132. In this manner, over time, the one or more machine-learned models 132 can increase the accuracy of generated balance shots. Particularly, the one or more machine-learned models 132 can learn whether the generated self-learning transfer function 180 generated an effective balance shot 150 for the rotating system 112. Vibration data from the after-balancing vibration survey at (316) can be provided along with the recorded self-learning transfer function 180 and the balance shot 150 so that such a determination can be made. The self-learning transfer function generated for each engine, the balance shot, and vibration data collected at the after-balancing vibration survey can be recorded and stored for each engine of a fleet balanced by the balancing system 100. Such data can be used to train the one or more machine-learned models 132 thereby further optimizing the generated balance shots as more data is gathered.

The balancing system 100 and method (300) of balancing a rotating system provided herein provide a number of advantages over conventional balancing systems and methods. For instance, conventional systems generate rotating system balancing shots or solutions using a generic transfer function that is not specific to the actual engine undergoing balancing. The transfer function generated by the systems and method provided herein for a given rotating system is specific to the rotating system. The transfer function can account for engine operating parameters, assembly parameters, usage parameters, environmental parameters, life cycle parameters, some combination of the foregoing that are all specifically associated with the rotating system, or more generally, the gas turbine engine in which the rotating system is incorporated. The machine-learned models provided herein can be applied to generate optimum balance solutions from noisy and real input parameters. Such an engine-specific transfer function can reduce the number of trim or balance shots required to bring the vibration response of the rotating system within acceptable levels. In this way, a reduction in operator time to balance on-wing and/or production engines can be achieved, the number of flight tests can be reduced, engine time-on-wing can be increased, and cost savings can be realized.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method of balancing a rotating system of an engine, the method comprising: receiving, by one or more processors, data that includes parameter values for parameters associated with the rotating system; generating, by the one or more processors, a transfer function specific to the rotating system by applying one or more machine-learned models to the parameter values; and generating, by the one or more processors, a balance shot as an output of the one or more machine-learned models based at least in part on the transfer function specific to the rotating system, the balance shot indicating one or more physical locations at which one or more balancing weights are to be added or removed from the rotating system.

2. The method of any preceding clause, further comprising: receiving, by the one or more processors, vibration data indicating a vibration level of the rotating system; and determining, by the one or more processors, whether the vibration level of the rotating system exceeds a limit, and wherein the one or more processors receive the data that includes the parameter values for the parameters associated with the rotating system in response to whether the vibration level of the rotating system exceeds the limit.

3. The method of any preceding clause, further comprising: attaching to or removing from the rotating system the one or more balancing weights based at least in part on the balance shot.

4. The method of any preceding clause, wherein generating, by the one or more processors, the transfer function specific to the rotating system by applying the one or more machine-learned models to the parameter values comprises: generating, by the one or more processors, a main effects plot for respective ones of the parameters associated with the rotating system by applying the one or more machine-learned models to the parameter values for the parameters associated with the rotating system.

5. The method of any preceding clause, wherein generating, by the one or more processors, the transfer function specific to the rotating system by applying the one or more machine-learned models to the parameter values further comprises: selecting, by the one or more processors, an effective set of parameter values based at least in part on the main effects plots generated for the parameters, and wherein the transfer function specific to the rotating system is generated by applying the one or more machine-learned models based at least in part on the parameter values selected for inclusion in the effective set of parameter values and not the parameter values not selected for the effective set of parameter values.

6. The method of any preceding clause, wherein selecting, by the one or more processors, the effective set of parameter values based at least in part on the main effects plots generated for the parameters comprises: determining, by the one or more processors, which of the parameter values are within their respective dispersion thresholds, each of the parameter values having an associated dispersion threshold, and wherein the parameter values within their respective dispersion thresholds are selected for inclusion in the effective set of parameter values and wherein the parameter values not within their respective dispersion thresholds are not selected for inclusion in the effective set of parameter values.

7. The method of any preceding clause, wherein the parameters associated with the rotating system include one or more engine operating parameters, the engine operating parameters including at least one of a rotational speed of the rotating system, an oil temperature or pressure, a vibration of the rotating system, a phase angle of the rotating system, and a mode position of the rotating system.

8. The method of any preceding clause, wherein the parameters associated with the rotating system include one or more assembly parameters associated with assembly of the rotating system.

9. The method of any preceding clause, wherein the assembly parameters include at least one a residual unbalance of the rotating system, a fan blade mapping, and a spool or rotor concentricity of the rotating system.

10. The method of any preceding clause, wherein the assembly parameters include at least one ambient condition present during assembly of the rotating system.

11. The method of any preceding clause, wherein the parameters associated with the rotating system include one or more usage parameters indicating a manner in which the rotating system has been used.

12. The method of any preceding clause, wherein the parameters associated with the rotating system include one or more life cycle parameters associated with life cycle events of the rotating system.

13. A system, comprising: one or more memory devices; and one or more processors, the one or more processors being configured to: receive data that includes parameter values for parameters associated with a rotating system; generate a transfer function specific to the rotating system by applying one or more machine-learned models to the parameter values; and generate a balance shot as an output of the one or more machine-learned models based at least in part on the transfer function specific to the rotating system, the balance shot indicating one or more physical locations at which one or more balancing weights are to be added or removed from the rotating system.

14. The system of any preceding clause, wherein in generating the transfer function specific to the rotating system by applying the one or more machine-learned models to the parameter values, the one or more processors are configured to: generate a main effects plot for respective ones of the parameters associated with the rotating system by applying the one or more machine-learned models to the parameter values for the parameters associated with the rotating system.

15. The system of any preceding clause, wherein in generating the transfer function specific to the rotating system by applying the one or more machine-learned models to the parameter values, the one or more processors are configured to: select an effective set of parameter values based at least in part on the main effects plots generated for the parameters associated with the rotating system, and wherein the transfer function specific to the rotating system is generated by applying the one or more machine-learned models based at least in part on the parameter values selected for inclusion in the effective set of parameter values and not the parameter values not selected for the effective set of parameter values.

16. The system of any preceding clause, wherein in selecting the effective set of parameter values based at least in part on the main effects plots generated for the parameters associated with the rotating system, the one or more processors are configured to: determine which parameter values are within their respective dispersion thresholds, each of the parameter values having an associated dispersion threshold, and wherein the parameter values within their respective dispersion thresholds are selected for inclusion in the effective set of parameter values and wherein the parameter values not within their respective dispersion thresholds are not selected for inclusion in the effective set of parameter values.

17. A non-transitory computer readable medium comprising computer-executable instructions, which, when executed by one or more processors of a balancing system, cause the one or more processors to: receive data that includes parameter values for parameters associated with a rotating system; generate a transfer function specific to the rotating system by applying one or more machine-learned models to the parameter values; and generate a balance shot as an output of the one or more machine-learned models based at least in part on the transfer function specific to the rotating system, the balance shot indicating one or more physical locations at which one or more balancing weights are to be added or removed from the rotating system.

18. The non-transitory computer readable medium of any preceding clause, wherein the one or more machine-learned models include at least one model structured as a least squares optimization model.

19. The non-transitory computer readable medium of any preceding clause, wherein the parameters associated with the rotating system include one or more engine operating parameters, one or more assembly parameters, one or more usage parameters, one or more environmental parameters, and one or more life cycle parameters.

20. The non-transitory computer readable medium of any preceding clause, wherein the rotating system is incorporated in an aviation gas turbine engine.

What is claimed is:

1. A method of balancing a rotating system of an engine, the method comprising:
receiving, by one or more processors, data that includes parameter values for parameters associated with the rotating system;
generating, by the one or more processors, a transfer function specific to the rotating system by applying a machine-learned model to the parameter values including generating, by the one or more processors, a main effects plot for respective ones of the parameters associated with the rotating system by applying the machine-learned model to the parameter values for the parameters associated with the rotating system;
generating, by the one or more processors, a balance shot as an output of the machine-learned model based at least in part on the transfer function specific to the rotating system, the balance shot indicating one or more physical locations at which one or more balancing weights are to be added or removed from the rotating system; and
attaching to or removing from the rotating system the one or more balancing weights based at least in part on the balance shot.

2. The method of claim 1, further comprising:
receiving, by the one or more processors, vibration data indicating a vibration level of the rotating system; and
determining, by the one or more processors, whether the vibration level of the rotating system exceeds a limit, and
wherein the one or more processors receive the data that includes the parameter values for the parameters associated with the rotating system in response to whether the vibration level of the rotating system exceeds the limit.

3. The method of claim 1, wherein generating, by the one or more processors, the transfer function specific to the rotating system by applying the machine-learned model to the parameter values further comprises:
selecting, by the one or more processors, an effective set of parameter values based at least in part on the main effects plots generated for the parameters, and
wherein the transfer function specific to the rotating system is generated by applying the machine-learned model based at least in part on the parameter values selected for inclusion in the effective set of parameter values and not the parameter values not selected for the effective set of parameter values.

4. The method of claim 3, wherein selecting, by the one or more processors, the effective set of parameter values based at least in part on the main effects plots generated for the parameters comprises:
determining, by the one or more processors, which of the parameter values are within their respective dispersion thresholds, each of the parameter values having an associated dispersion threshold, and
wherein the parameter values within their respective dispersion thresholds are selected for inclusion in the effective set of parameter values and wherein the parameter values not within their respective dispersion thresholds are not selected for inclusion in the effective set of parameter values.

5. The method of claim 1, wherein the parameters associated with the rotating system include one or more engine operating parameters, the engine operating parameters including at least one of a rotational speed of the rotating system, an oil temperature or pressure, a vibration of the rotating system, a phase angle of the rotating system, and a mode position of the rotating system.

6. The method of claim 1, wherein the parameters associated with the rotating system include one or more assembly parameters associated with assembly of the rotating system, and wherein sensors located on the engine measure the parameter values.

7. The method of claim 6, wherein the assembly parameters include at least one a residual unbalance of the rotating system, a fan blade mapping, and a spool or rotor concentricity of the rotating system.

8. The method of claim 6, wherein the assembly parameters include at least one ambient condition present during assembly of the rotating system.

9. The method of claim 1, wherein the parameters associated with the rotating system include one or more usage parameters indicating a manner in which the rotating system has been used.

10. The method of claim 1, wherein the parameters associated with the rotating system include one or more life cycle parameters associated with life cycle events of the rotating system.

11. A system for balancing a rotating system of an engine, the system comprising:
one or more memory devices; and
one or more processors, the one or more processors being configured to:
receive data that includes parameter values for parameters associated with a rotating system;
generate a transfer function specific to the rotating system by applying a machine-learned model to the parameter values including the one or more processors being configured to generate a main effects plot for respective ones of the parameters associated with the rotating system by applying the machine-learned model to the parameter values for the parameters associated with the rotating system;
generate a balance shot as an output of the machine-learned model based at least in part on the transfer function specific to the rotating system, the balance shot indicating one or more physical locations at which one or more balancing weights are to be added or removed from the rotating system; and
attach to or remove from the rotating system the one or more balancing weights based at least in part on the balance shot.

12. The system of claim 11, wherein sensors located on the engine measure the parameter values.

13. The system of claim 11, wherein in generating the transfer function specific to the rotating system by applying the machine-learned model to the parameter values, the one or more processors are configured to:
select an effective set of parameter values based at least in part on the main effects plots generated for the parameters associated with the rotating system, and
wherein the transfer function specific to the rotating system is generated by applying the machine-learned model based at least in part on the parameter values selected for inclusion in the effective set of parameter values and not the parameter values not selected for the effective set of parameter values.

14. The system of claim 13, wherein in selecting the effective set of parameter values based at least in part on the main effects plots generated for the parameters associated with the rotating system, the one or more processors are configured to:
determine which parameter values are within their respective dispersion thresholds, each of the parameter values having an associated dispersion threshold, and
wherein the parameter values within their respective dispersion thresholds are selected for inclusion in the effective set of parameter values and wherein the parameter values not within their respective dispersion thresholds are not selected for inclusion in the effective set of parameter values.

15. A non-transitory computer readable medium comprising computer-executable instructions, which, when executed by one or more processors of a balancing system, cause the one or more processors to:
receive data that includes parameter values for parameters associated with a rotating system;
generate a transfer function specific to the rotating system by applying a machine-learned model to the parameter values including the one or more processors being configured to generate a main effects plot for respective ones of the parameters associated with the rotating system by applying the machine-learned model to the parameter values for the parameters associated with the rotating system;
generate a balance shot as an output of the machine-learned model based at least in part on the transfer function specific to the rotating system, the balance shot indicating one or more physical locations at which one or more balancing weights are to be added or removed from the rotating system; and
attach to or remove from the rotating system the one or more balancing weights based at least in part on the balance shot.

16. The non-transitory computer readable medium of claim 15, wherein the machine-learned model include at least one model structured as a least squares optimization model.

17. The non-transitory computer readable medium of claim 15, wherein the parameters associated with the rotating system include one or more engine operating parameters, one or more assembly parameters, one or more usage parameters, one or more environmental parameters, and one or more life cycle parameters.

18. The non-transitory computer readable medium of claim 15, wherein the rotating system is incorporated in an aviation gas turbine engine and sensors located on the aviation gas turbine engine measure the parameter values.

* * * * *